United States Patent [19]
Kwik, Jr.

[11] 3,873,053
[45] Mar. 25, 1975

[54] RING TO STUD CONVERTER

[75] Inventor: John H. Kwik, Jr., Red Bank, N.J.

[73] Assignee: The United States of America as represented by the Secretary of the Army, Washington, D.C.

[22] Filed: July 3, 1974

[21] Appl. No.: 485,656

[52] U.S. Cl.................... 105/476, 105/484, 52/704, 52/758
[51] Int. Cl.......................... B61d 45/00, B60p 7/08
[58] Field of Search................. 24/68 CD, 265 CD; 105/369 R, 369 A, 368 T; 280/179 A, 179 R; 248/119 R, 342, 343, 361 A, 361 R

[56] References Cited
UNITED STATES PATENTS

| | | |
|---|---|---|
| 3,223,375 | 12/1965 | Bernasconi..................... 248/361 R |
| 3,297,293 | 1/1967 | Andrews et al................. 248/361 R |
| 3,377,039 | 4/1968 | Hayes............................. 248/119 R |
| 3,412,693 | 11/1968 | Lewis............................. 105/369 A |

Primary Examiner—Donald A. Griffin
Attorney, Agent, or Firm—Nathan Edelberg; Robert P. Gibson; Arthur L. Bowers

[57] ABSTRACT

The conversion of a cargo ring fitting to a rigid threaded stud type device is accomplished by clamping the ring between two members, the clamp, and utilizing the interference of those members with the surface of the fitting to prevent motion of the ring and clamp combination. A threaded stud is provided which is fixedly positioned approximately normal to the surface of the combination of ring and clamp.

4 Claims, 1 Drawing Figure

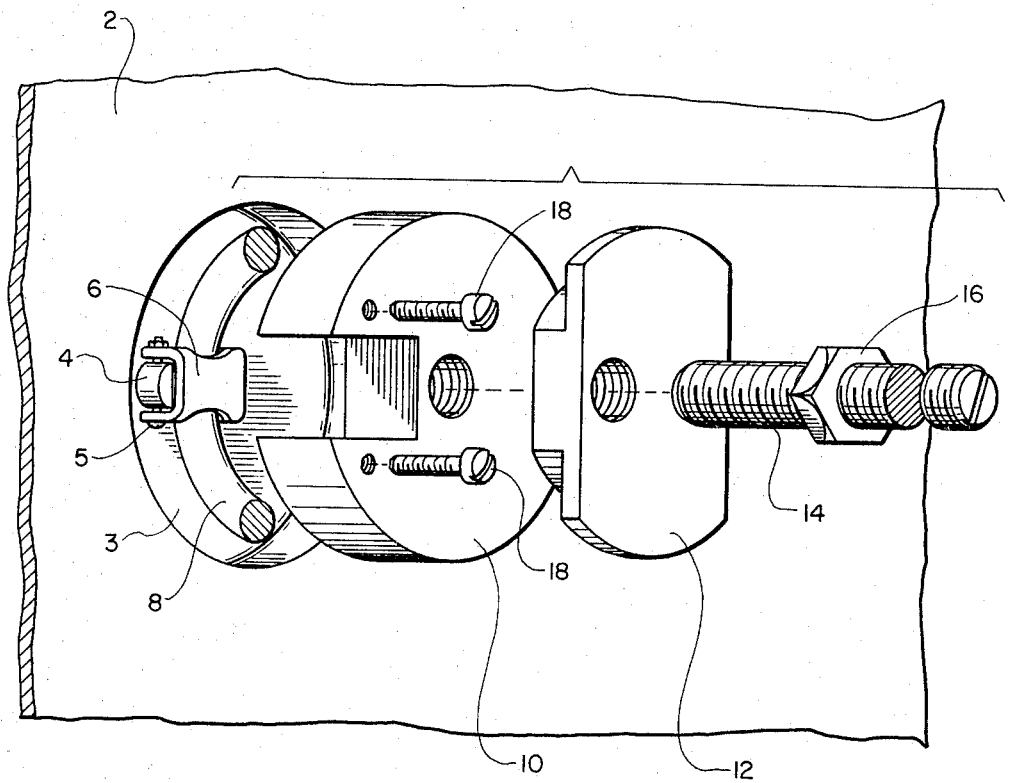

RING TO STUD CONVERTER

BACKGROUND OF THE INVENTION

To secure equipment to planar surfaces when changes in the configuration of equipment layout are anticipated it has been the general practice to employ ring type fasteners combined with ropes and straps. The use of such fasteners is unsatisfactory in that they lack the required rigidity.

SUMMARY OF THE INVENTION

This invention is a mechanical device which combines with a ring fitting and introduces an interference between the combination and the surface to which it attaches. By creating this interference it locks the ring and establishes a strong base to which a rigid stud is attached.

The object of the invention is to convert a ring type fitting to a strong, rigid, stud type without damaging the ring type fitting. Other objects and advantages of the invention will hereinafter become more fully apparent from the annexed drawing.

BRIEF DESCRIPTION OF THE DRAWING

The single FIGURE is an exploded view of a preferred embodiment of the invention.

DESCRIPTION OF THE PREFERRED EMBODIMENT

The invention is used in combination with a conventional cargo ring fitting comprised of a rigid planar surface 2 with a circular recess 3; a post 4 located off center in the recess and projecting from the bottom of the recess to the plane of the rigid planar surface with a hole for a pin 5 which extends through the post; and a U-shaped hinge 6, the open end of which is connected to each end of the pin 5 and the parallel sides of which are provided with in-line circular holes having a ring 8 passing through.

A lower clamp 10 slip fits into the recess 3 of the ring fitting. The lower clamp 10 is slotted laterally to a width and length which enables it to be inserted in the recess 3 without interference with the post 4 or hinge 6.

It is essential for the operation of the invention that the lower clamp 10 protrudes beyond the post 4 and hinge 6 on both sides and rests against either the bottom of the recess 3 or the rigid planar surface 2. The stronger the lower clamp 10 material and the rigid planar surface 3 and the larger the surface area covered by the lower clamp 10 past the post 4 and hinge 6, the stronger the adaptor will be. The lower clamp 10 is drilled and tapped in the center and on each side of the lateral slot. The thickness of the lower clamp 10 is such that when placed in the recess 3 and the ring 8 is folded over it the ring 8 lies in a plane parallel to the plane of the rigid surface 2. An upper clamp 12 is placed over the ring 8 and lower clamp 10 when the lower clamp 10 is in the recess 3 as described above. The upper clamp 12 is an integral stepped member having a circular portion which rests in the ring 8 and a portion which projects in two directions past the circular portion and rests on the surface of the ring 8 opposite the ring surface resting on the lower clamp 10 so that the ring 8 is sandwiched between the upper and lower clamps 12, 10. The upper clamp 12 is drilled to allow a threaded stud 14 to pass through it and engage the center hole of the lower clamp 10. A nut 16 is threaded down on the stud 14 until it abuts the upper clamp 12 in order to tightly sandwich the ring 8 between the upper and lower clamps 12, 10. Two machine screws 18 are then threaded through the holes in either side of the lateral slot in the lower clamp 10 so that they butt up against the floor of the recess 3 and take up any play in a direction normal to the rigid planar surface 2 between the combination and the rigid planar surface 2.

What is claimed is:

1. The combination with a cargo ring fitting having a recess in a rigid planar surface; a post, located off center in the recess and projecting from the bottom of the recess to the plane of the surface, having a hole for a pin extending through the post; a U-shaped hinge, the open end of which is connected to each end of the pin and the parallel sides of which are provided with in line circular holes having a ring passing through; of a ring to stud converter comprised of:
   - a means for clamping and sandwiching the ring and bracketing the hinge preventing motion of the ring about the hinge and post;
   - a stud fixedly attached to the clamping means and projecting substantially normal to the rigid planar surface; and
   - a means for removing play in a direction normal to the rigid planar surface between the ring and clamping means combination and the rigid planar surface.

2. The combination as defined in claim 1 wherein the clamping means is composed of a lower and an upper clamp, at least one of which brackets the hinge for the purpose of preventing motion of the ring about the hinge and post, the lower clamp slip fitting into the recess and of a thickness such that when in the recess and the ring is placed on it, the ring is parallel to the plane of the rigid surface and said stud secures said clamps together.

3. The combination as defined in claim 1 wherein the stud is threaded into the lower clamp.

4. The combination as defined in claim 1 wherein the means for removing play comprises two screws which pass through the lower clamp and abut the floor of the recess or the rigid planar surface.

* * * * *